US009228122B2

(12) United States Patent
Chatterji et al.

(10) Patent No.: US 9,228,122 B2
(45) Date of Patent: Jan. 5, 2016

(54) METHODS AND CEMENT COMPOSITIONS UTILIZING TREATED POLYOLEFIN FIBERS

(71) Applicant: Halliburton Energy Services, Inc., Houston, TX (US)

(72) Inventors: Jiten Chatterji, Duncan, OK (US); James Robert Benkley, Duncan, OK (US); Gregory Robert Hundt, Marlow, OK (US); Darrell Chad Brenneis, Marlow, OK (US); John Lewis Dennis, Jr., Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/910,894

(22) Filed: Jun. 5, 2013

(65) Prior Publication Data

US 2014/0364535 A1 Dec. 11, 2014

(51) Int. Cl.
| | |
|---|---|
| C09K 8/00 | (2006.01) |
| C04B 28/00 | (2006.01) |
| C04B 28/04 | (2006.01) |
| E02D 29/00 | (2006.01) |
| C09K 8/42 | (2006.01) |
| C09K 8/487 | (2006.01) |
| C09K 8/473 | (2006.01) |
| C04B 28/02 | (2006.01) |

(52) U.S. Cl.
CPC .................. *C09K 8/487* (2013.01); *C04B 28/02* (2013.01); *C09K 8/426* (2013.01); *C09K 8/428* (2013.01); *C09K 8/473* (2013.01); *C09K 2208/08* (2013.01)

(58) Field of Classification Search
CPC ....................................................... C09K 8/487
USPC ........................................................... 523/130
See application file for complete search history.

(56) References Cited

U.S. PATENT DOCUMENTS

| | | | | |
|---|---|---|---|---|
| 3,363,689 A | * | 1/1968 | Smith et al. | 166/292 |
| 3,865,779 A | * | 2/1975 | Oya et al. | 524/7 |
| 3,984,444 A | | 10/1976 | Ritz et al. | |
| 4,729,854 A | | 3/1988 | Miyata et al. | |
| 5,330,827 A | | 7/1994 | Hansen | |
| 5,399,195 A | * | 3/1995 | Hansen et al. | 106/711 |

(Continued)

FOREIGN PATENT DOCUMENTS

JP 2005-220498 8/2005

OTHER PUBLICATIONS

Alagirusamy et al., editor, Technnical Textile Yarns: Industrial and Medical Applications, 2010, Woodhead Publishing Limited, p. 9-13.*

(Continued)

*Primary Examiner* — David Karst
(74) *Attorney, Agent, or Firm* — Craig W. Roddy; Tumey L.L.P.

(57) ABSTRACT

Methods and cement compositions are provided that utilize treated polyolefin fibers for lost circulation and/or mechanical property enhancement. Disclosed is a method comprising: providing a cement composition comprising: a hydraulic cement; water; and treated polyolefin fibers that are rod-shaped and have a length in a range from about 0.0625 inches to about 0.25 inches, wherein the treated polyolefin fibers have been treated with a surfactant to make the treated polyolefin fibers hydrophilic; placing the cement composition in a selected location; and allowing the cement composition to set.

24 Claims, 2 Drawing Sheets

(56) References Cited

U.S. PATENT DOCUMENTS

| | | |
|---|---|---|
| 6,010,786 A | 1/2000 | Takai |
| 6,220,354 B1 | 4/2001 | Chatterji et al. |
| 6,308,777 B2 | 10/2001 | Chatterji et al. |
| 6,500,252 B1 | 12/2002 | Chatterji et al. |
| 6,762,339 B1 | 7/2004 | Klun et al. |
| 6,902,002 B1 | 6/2005 | Chatterji et al. |
| 7,174,961 B2 | 2/2007 | Chatterji et al. |
| 7,229,492 B2 | 6/2007 | Chatterji et al. |
| 7,493,968 B2 | 2/2009 | Reddy et al. |
| 7,612,021 B2 | 11/2009 | Chatterji et al. |
| 2005/0204961 A1 | 9/2005 | Chatterji et al. |
| 2006/0000611 A1* | 1/2006 | Reddy et al. .................. 166/293 |
| 2006/0078729 A1 | 4/2006 | Yabuki et al. |

OTHER PUBLICATIONS

Halliburton Product Data Sheet for "Barafibre® Lost Circulation Material," Aug. 31, 2010, pp. 1-2.

Halliburton Brochure for "Tuf Additive No. 2™ Lost Circulation Additive," Aug. 2007, pp. 1-2.

Halliburton Brochure for WellLife® 734 Additive, p. 1, 2012.

Search Report and Written Opinion of the International Searching Authority, International Appl. No. PCT/US2014/039927, dated Sep. 24, 2014.

\* cited by examiner

METHODS AND CEMENT COMPOSITIONS UTILIZING TREATED POLYOLEFIN FIBERS

BACKGROUND

The present invention relates to cementing operations and, more particularly, in certain embodiments, to methods and cement compositions that utilize treated polyolefin fibers for lost circulation and/or mechanical property enhancement.

In cementing operations, such as well construction and remedial cementing, cement compositions are commonly utilized. Cement compositions may be used in primary cementing operations whereby pipe strings, such as casing and liners, are cemented in well bores. In a typical primary cementing operation, a cement composition may be pumped into an annulus between the exterior surface of the pipe string disposed therein and the walls of the well bore (or a larger conduit in the well bore). The cement composition may set in the annulus, thereby forming an annular sheath of hardened, substantially impermeable material (e.g., a cement sheath) that may support and position the pipe string in the well bore and may bond the exterior surface of the pipe string to the well bore walls (or to the larger conduit). Among other things, the cement sheath surrounding the pipe string should function to prevent the migration of fluids in the annulus, as well as protecting the pipe string from corrosion. Cement compositions also may be used in remedial cementing methods, such as in squeeze cementing for sealing voids in a pipe string, cement sheath, gravel pack, subterranean formation, and the like.

Once set, the cement sheath may be subjected to a variety of shear, tensile, impact, flexural, and compressive stresses that may lead to failure of the cement sheath, resulting, inter alia, in fractures, cracks, and/or debonding of the cement sheath from the pipe string and/or the formation. This may lead to undesirable consequences such as lost production, environmental pollution, hazardous rig operations resulting from unexpected fluid flow from the formation caused by the loss of zonal isolation, and/or hazardous production operations. Cement failures may be particularly problematic in high temperature wells, where fluids injected into the wells or produced from the wells by way of the well bore may cause the temperature of any fluids trapped within the annulus to increase. Furthermore, high fluid pressures and/or temperatures inside the pipe string may cause additional problems during testing, perforation, fluid injection, and/or fluid production. If the pressure and/or temperature inside the pipe string increases, the pipe may expand and stress the surrounding cement sheath. This may cause the cement sheath to crack, or the bond between the outside surface of the pipe string and the cement sheath to fail, thereby breaking the hydraulic seal between the two. Furthermore, high temperature differentials created during production or injection of high temperature fluids through the well bore may cause fluids trapped in the cement sheath to thermally expand, causing high pressures within the sheath itself. Additionally, failure of the cement sheath also may be caused by forces exerted by shifts in subterranean formations surrounding the well bore, cement erosion, and repeated impacts from the drill bit and the drill pipe.

To counteract these problems associated with the fracturing and/or cracking of the cement sheath, fibers may be included in the cement composition. Various types of fibers have been used heretofore, including those formed of polypropylene, polyester, polyamide, polyethylene, polyolefin, glass, iron, and steel. These fibers may function to control shrinkage cracking in the early stages of the cement setting process, and also may provide resiliency, ductility, and toughness to the set cement composition so that it resists cracking or fracturing. Further, if fracturing or cracking does occur, the fibers may function to hold the set cement composition together, thereby resisting fall back of the cement sheath. Additionally, the fibers may act as lost circulation materials. While polyolefin fibers may be the most preferred in that they are readily available, polyolefin fibers tend to be hydrophobic and difficult to dry blend with cement. The fibers tend to agglomerate in dry cement when it is conveyed causing plugging to occur, and when the cement and fibers are combined with mixing water, the fibers form mates which prevent their dispersion into and throughout the cement composition. The lack of dispersion of the fibers in the cement composition can make it difficult to pump. In some instances, hydrophilic polyolefin fibers have been used in an attempt to improve dry blending, but the hydrophilic polyolefin fibers have not be suitable for dry blending on a commercial scale, for example, due to problems with buildup of blockage in the equipment.

SUMMARY

An embodiment provides a method of a method of cementing comprising: providing a cement composition comprising: a hydraulic cement; water; and treated polyolefin fibers that are rod-shaped and have a length in a range from about 0.0625 inches to about 0.25 inches, wherein the treated polyolefin fibers have been treated with a surfactant to make the treated polyolefin fibers hydrophilic; placing the cement composition in a selected location; and allowing the cement composition to set.

Another embodiment provides a method of controlling lost circulation in a subterranean formation comprising: providing treated polyolefin fibers that are treated and have a length in a range from about 0.0625 inches to about 0.25 inches, wherein the treated polyolefin fibers have been treated with a surfactant to make the treated polyolefin fibers hydrophilic; and introducing a cement composition comprising the treated polyolefin fibers into a well bore penetrating the subterranean formation such that the treated polyolefin fibers reduce loss of the fluid and/or subsequently introduced fluids into the subterranean formation.

Yet another embodiment provides a cementing system comprising a cement composition, wherein the cement composition comprises a hydraulic cement; water; and treated polyolefin fibers that are rod-shaped and have a length in a range from about 0.0625 inches to about 0.25 inches, wherein the treated polyolefin fibers have been treated with a surfactant to make the treated polyolefin fibers hydrophilic.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
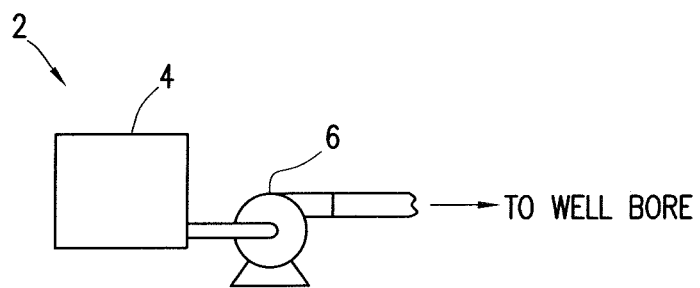
FIG. 1 illustrates a system for preparation and delivery of a cement composition to a well bore in accordance with embodiments of the present invention.

The present invention relates to cementing operations and, more particularly, in certain embodiments, to methods and cement compositions that utilize treated polyolefin fibers for lost circulation and/or mechanical property enhancement. One of the many potential advantages of embodiments of the present invention is that the polyolefin fibers have been sized and treated to enhance their dry blending capabilities. Because embodiments of the polyolefin fibers can be easily dry blended with the hydraulic cement and subsequently dispersed in the cement composition, they can improve the efficiency and ease of operation for field operations. In contrast, other polyolefin fibers typically have to be added to the mix water due to problems associated with their dry blending. By effective dispersion of the treated polyolefin fibers in the cement composition, the ductility of the set cement composition may be enhanced, thus preventing cracking and shattering of the set cement composition when exposed to downhole forces. Additionally, the treated polyolefin fibers may also improve mechanical properties (e.g. compressive strength) of the set cement composition while also aiding in the prevention of lost circulation.

Embodiments of the cement compositions may comprise a hydraulic cement, water, and treated polyolefin fibers. Additional additives may be included in the cement compositions as desired by those of ordinary skill in the art. Those of ordinary skill in the art will appreciate that the cement compositions generally should have a density suitable for a particular application. By way of example, the cement composition may have a density of about 4 pounds per gallon ("lb/gal") to about 20 lb/gal. In certain embodiments, the cement compositions may have a density of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. In some embodiments, the cement compositions may be foamed with one or more foaming surfactants and a gas. Those of ordinary skill in the art, with the benefit of this disclosure, should recognize the appropriate density for a particular application.

Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements, and combinations thereof. In certain embodiments, the hydraulic cement may comprise a Portland cement. In some embodiments, the Portland cements are classified as Classes A, C, H, or G cements according to American Petroleum Institute, *API Specification for Materials and Testing for Well Cements*, API Specification 10, Fifth Ed., Jul. 1, 1990. In addition, in some embodiments, the hydraulic cement may include cements classified as ASTM Type I, II, or III.

The water used in embodiments of the cement compositions of the present invention may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the cement compositions. In some embodiments, the water may be included in an amount sufficient to form a pumpable slurry. In some embodiments, the water may be included in the cement compositions of the present invention in an amount in a range of from about 40% to about 200% by weight of the hydraulic cement. In some embodiments, the water may be included in an amount in a range of from about 40% to about 150% by weight of the hydraulic cement.

Embodiments of the cement compositions may comprise treated polyolefin fibers. Examples of suitable polyolefin fibers include polypropylene fibers, polyethylene fibers, other polyolefin fibers, and combinations thereof. Polyethylene fibers that may be particularly useful in certain embodiments are available from Forta Corporation, Grove City, Pa. In accordance with present embodiments, the polyolefin fibers may be rod-shaped fibers. The rod-shaped fibers generally may be non-fibrillated. It is believed that the non-fibrillated, rod-shaped fibers may have improved dry blending capabilities as opposed to fibers having alternative configurations, such as fibrillated net fibers.

In general, the polyolefin fibers have been treated with a surfactant to make them hydrophilic. As used herein, the term "hydrophilic" refers to substrates (e.g., fibers) that can be wet by water. In some embodiments, the polyolefin fibers have been surface treated with the surfactant, for example, by spraying with, or immersing in, the surfactant. In alternative embodiments, a polymer and surfactant can be melt blended prior to extrusion or melt blowing to provide a fiber with the surfactant distributed throughout. The polyolefin fibers may contain the surfactant in an amount in a range of from about 0.1% to about 10% by weight of the fiber, and, alternatively, from about 0.5% to about 1% by weight of the fiber.

The surfactants useful in treating the polyolefin fibers may include any of a variety of different surfactants capable of imparting hydrophilicity to the polyolefin fibers. Examples of suitable surfactants include fatty acid ester surfactants, which may include a fatty acid component having from 10 carbon atoms to 24 carbon atoms and a mono- or polyhydric alcohol component having from 1 carbon atoms to about 12 carbon atoms. Examples of suitable fatty acid components include stearic acid and oleic acid. Examples of suitable alcohol components include straight chained or branched alcohols with primary, secondary, or tertiary alcoholic OH groups, as well as glycerol, trimethylolethane or -propane, pentaerythritol, and diols such as ethanediol, propane-1, 2 or 1,3 diol or the various butane diols, and 2,2-diemethylpropane diol. Specific examples of suitable fatty acid ester surfactants include glycerol oleate and glycerol stearate. Additional examples of suitable surfactants include alkoxylated alkyl phenols. Combinations of suitable surfactants may also be used in certain embodiments.

The treated polyolefin fibers may be sized, for example, to enhance their dry blending capabilities. In some embodiments, the treated polyolefin fibers may have a mean length in a range of from about 0.0625 inches to about 0.25 inches and, alternatively, from about 0.0625 inches to about 0.125 inches. In particular embodiments, the treated polyolefin fibers may have a mean length of about 0.125 inches. Examples of suitable treated polyolefin fibers may have a mean diameter in a range of from about 0.00034 inch to about 0.0056 inches. Examples of suitable treated polyolefin fibers may have a denier in a range of from about 7 to about 10. The treated polyolefin fibers may be cut to any desired length, e.g., by mechanically cutting the fiber strands, so as to produces fibers having a desired length. As will be appreciated by those of ordinary skill in the art, with the benefit of this disclosure, the length and diameter of the treated polyolefin fibers may be adjusted to enhance certain properties such as their flexibility and ease of dispersion in embodiments of cement compositions of the present invention.

The treated polyolefin fibers general should be present in the cement compositions in an amount sufficient to provide the desired mechanical properties and/or lost circulation control. In some embodiments, the treated polyolefin fibers may be present in an amount in the range of from about 0.1% to about 5% by weight of the cement and, alternatively, from about 0.1% to about 1% by weight of the cement. One of ordinary skill in the art, with the benefit of this disclosure, should be able to select an appropriate amount of the treated polyolefin fibers to include for a particular application.

Embodiments of the cement compositions may be foamed with a foaming additive and a gas, for example, to provide a composition with a reduced density. In some embodiments, the cement composition may be foamed to have a density of less than about 12 pounds per gallon ("lbs/gal"), less than about 11 lbs/gal, or less than about 10 lbs/gal. In some embodiments, the cement composition may be foamed to have a density in a range of from about from about 4 lbs/gal to about 12 lbs/gal and, alternatively, about 7 lbs/gal to about 9 lbs/gal. The gas used for foaming the cement compositions may be any suitable gas for foaming the cement composition, including, but not limited to air, nitrogen, and combinations thereof. Generally, the gas should be present in embodiments of the cement composition in an amount sufficient to form the desired foam. In certain embodiments, the gas may be present in an amount in the range of from about 5% to about 80% by volume of the foamed cement composition at atmospheric pressure, alternatively, about 5% to about 55% by volume, and, alternatively, about 15% to about 30% by volume.

Foaming additives may be included in embodiments of the cement compositions to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Other additives suitable for use in cementing operations may also be added to embodiments of the cement compositions as desired for a particular application. Examples of such additives include, but are not limited to, dispersants, strength-retrogression additives, set accelerators, set retarders, lightweight additives, gas-generating additives, mechanical property enhancing additives, lost-circulation materials, fluid loss control additives, defoaming additives, thixotropic additives, and any combination thereof. Specific examples of these, and other, additives include crystalline silica, fumed silica, silicates, silicalite, salts, fibers, hydratable clays, shale, microspheres, diatomaceous earth, natural pozzolan, cement kiln dust, resins, any combination thereof, and the like. A person having ordinary skill in the art, with the benefit of this disclosure, will readily be able to determine the type and amount of additive useful for a particular application and desired result.

Dispersants may be included in embodiments of the cement compositions. Where present, the dispersant should act, among other things, to control the rheology of the cement composition. While a variety of dispersants known to those skilled in the art may be used in accordance with the present invention, examples of suitable dispersants include naphthalene sulfonic acid condensate with formaldehyde; acetone, formaldehyde, and sulfite condensate; melamine sulfonate condensed with formaldehyde; any combination thereof.

Strength-retrogression additives may be included in embodiments of the cement composition to, for example, prevent the retrogression of strength after the cement composition has been allowed to develop compressive strength when the cement composition is exposed to high temperatures. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Set accelerators may be included in embodiments of the cement compositions to, for example, increase the rate of setting reactions. Control of setting time may allow for the ability to adjust to well bore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Set retarders may be included in embodiments of the cement compositions to, for example, increase the thickening time of the cement compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Lightweight additives may be included in embodiments of the cement compositions to, for example, decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in embodiments of the cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Mechanical-property-enhancing additives may be included in embodiments of the cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in embodiments of the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Fluid-loss-control additives may be included in embodiments of the cement compositions to, for example, decrease the volume of fluid that is lost to the subterranean formation. Properties of the cement compositions may be significantly influenced by their water content. The loss of fluid can subject the cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Defoaming additives may be included in embodiments of the cement compositions to, for example, reduce tendency for the cement composition to foam during mixing and pumping of the cement compositions. Examples of suitable defoaming additives include, but are not limited to, polyol silicone compounds. Suitable defoaming additives are available from Halliburton Energy Services, Inc., under the product name D-AIR™ defoamers.

Thixotropic additives may be included in embodiments of the cement compositions to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The components of the cement composition may be combined in any order desired to form a cement composition that can be placed into a subterranean formation. In addition, the components of the cement compositions may be combined using any mixing device compatible with the composition, including a bulk mixer, for example. In some embodiments, the cement compositions may be prepared by combining the dry components with water. Other additives may be combined with the water before it is added to the dry components. In some embodiments, the dry components may be dry blended prior to their combination with the water. For example, a dry blend may be prepared that comprises the hydraulic cement and the treated polyolefin fibers. As previously described, the treated polyolefin fibers may be more easily dry blended with the hydraulic cement than other polyolefin fibers that have been used previously. By way of examples, treated polyolefin fibers having a length of ⅛ of an inch, a diameter of 0.00042 inches, and a denier of 7 to 10, can be dry blended with hydraulic cement at concentrations as high as ½ of a pound per 94 pound sack of the hydraulic cement. A dry blend with this concentration (½ pound per sack) has been successfully transferred between two blending tanks. At the end of the transfer, visual and physical inspections showed no fiber buildup of blockage at the bulk transfer hose, valves, elbows, connections or cement head. The dry blend was subsequently transferred to a recirculating mixer mix head and mixed successfully at 16.4 lb/gal without any difficulty or problems. Dry blending of other polyolefin fibers that are longer in length (e.g., about 0.5 inches in length) has been problematic whether or not the polyolefin fibers have been treated. For example, problems associated with dry blending these longer polyolefin fibers may include buildup of blockage in the blending equipment, such as the bulk transfer hose, valves, elbows, connections, and/or the like. Other suitable techniques may be used for preparation of the cement compositions as will be appreciated by those of ordinary skill in the art in accordance with embodiments of the present invention.

In some embodiments, the cement compositions may develop a desirable compressive strength in the well bore annulus for subterranean cementing operations. Compressive strength is generally the capacity of a material or structure to withstand axially directed pushing forces. The compressive strength may be measured at a specified time after the cement compositions have been positioned and the cement compositions are maintained under specified temperature and pressure conditions. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann Instrument Company, Houston, Tex. Compressive strengths may be determined in accordance with API RP 10B-2, *Recommended Practice for Testing Well Cements*, First Edition, July 2005.

By way of example, embodiments of the cement compositions may develop a 24-hour compressive strength in the subterranean formation in a range of from about 250 psi to about 20,000 psi and, alternatively, from about 3,000 psi about 7,000 psi. In some embodiments, the 24-hour compressive strength may be characterized as the destructive compressive strength as measured at atmospheric pressure and temperatures in a range of from about 50° F. to about 400° F., alternatively, in a range of from about 80° F. to about 250° F.

Embodiments of the cement compositions may be used in a variety of applications, including subterranean cementing applications such as primary and remedial cementing, among others. Embodiments may include providing a cement composition and allowing the cement composition to set. Embodiments of the cement compositions may comprise a hydraulic cement, water, and treated polyolefin fibers. As used herein, introducing the cement composition into a subterranean formation includes introduction into any portion of the subterranean formation, including, without limitation, into a well bore drilled into the subterranean formation, into a near well bore region surrounding the well bore, or into both.

In primary-cementing embodiments, for example, a cement composition may be introduced into a well-bore annulus and allowed to set in the well-bore annulus to form a hardened mass. The well-bore annulus may include, for example, an annular space between a conduit (e.g., pipe string, liner, etc.) and a wall of a well bore or between the conduit and a larger conduit in the well bore. Generally, in most instances, the hardened mass should fix the conduit in the well bore.

In remedial-cementing embodiments, a cement composition may be used, for example, in squeeze-cementing operations or in the placement of plugs. By way of example, the cement composition may be placed in a well bore to plug a void or crack in the formation, in a gravel pack, in the conduit, in the cement sheath, and/or a microannulus between the cement sheath and the conduit. In another embodiment, the cement composition may be placed into a well bore to form a plug in the well bore with the plug, for example, sealing the well bore.

Figure 2:
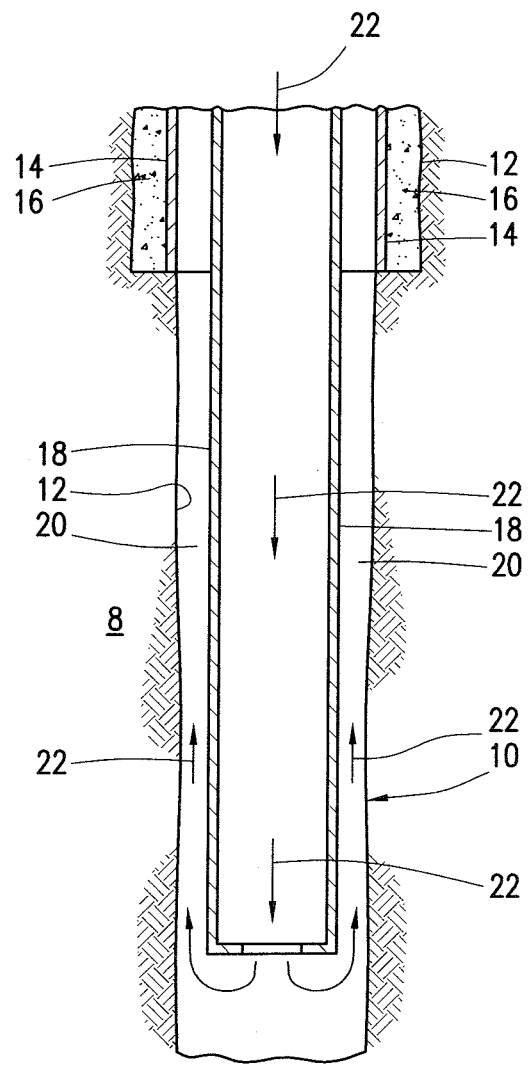
FIG. 2 illustrates placement of a cement composition into a well bore annulus in accordance with embodiments of the present invention.

Referring now to FIGS. 1 and 2, preparation and use of a cement composition in accordance with embodiments of the present invention will now be described. FIG. 1 illustrates a system 2 for preparation of a cement composition and delivery to a well bore in accordance with embodiments of the present invention. As shown, the cement composition may be mixed in mixing equipment 4, such as mixer or recirculating tub, and then pumped via pumping equipment 6 to the well bore. FIG. 2 illustrates placement of the cement composition into a subterranean formation 8 in accordance with embodiments of the present invention. As illustrated, a well bore 10 may be drilled into the subterranean formation 8. While well bore 10 is shown extending generally vertically into the subterranean formation 8, embodiments of the present invention are also applicable to well bores that extend at an angle through the subterranean formation 8, such as horizontal and slanted well bores. The well bore 10 comprises walls 12. As illustrated, a surface casing 14 has been inserted into the well bore 10. The surface casing 14 may be cemented to the walls 12 of the well bore 10 by cement sheath 16. A cement composition such as the cement compositions described previously may be placed into the subterranean formation 8 and allowed to set to form the cement sheath 16. In the illustrated embodiment, one or more additional pipe strings, shown here as casing 18 may also be disposed in the well bore 10. As illustrated, there is a well bore annulus 20 formed between the casing 18 and the walls 12 of the well bore 10 and/or the surface casing 14. Embodiments of the cement compositions may be prepared by a variety of methods as will be apparent to those of ordinary skill. The cement composition may then be pumped down the casing 18, as shown in FIG. 2 by directional arrows 22. The cement composition may be allowed to flow down through the bottom of the casing 18 and up around the casing 18 into the well bore annulus 20. The cement composition may displace other fluids, such as drilling fluids and/or spacer fluids that may be present in the well bore annulus 20.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present invention, the following examples of some of the preferred embodiments are given. In no way should such examples be read to limit, or to define, the scope of the invention.

Example 1

The following series of tests were performed to evaluate the mechanical properties of the cement compositions comprising the treated polyolefins. Four different cement compositions, designated Samples 1-4, were prepared using the indicated amounts of fibers. The Samples also included Portland Class G cement and sufficient water to provide a density of 16.4 lb/gal. Sample 2 comprised non-fibrillated, rod-shaped polyolefin fibers having a length of ⅛ of an inch, a diameter of 0.00042 inches, and a denier of 7 to 10. The rod-shaped polyolefin fibers were treated with a glycerol oleate surfactant to make them hydrophilic. Samples 1, 3, and 4 were controls. Sample 1 comprised fibrillated net-shaped polyolefin fibers having a length of ½ inches. The net-shaped polyolefin fibers were treated with a surfactant to make them hydrophilic. The polyolefin fibers used for the tests are available from Forta Corporation, Grove City, Pa. Sample 3 comprised glass fibers having a length of ¼ inches. The glass fibers are available from Halliburton Energy Services, Inc. as WellLife® Additive. Sample 4 was neat cement without the inclusion of fibers.

After preparation, the samples were allowed to cure for forty-eight in 2" by 4" metal cylinders that were placed in a water bath at 170° F. to form set cylinders and the resulting set cylinders were tested for mechanical properties in accordance with API RP 10B-2. The results of the tests are set forth in the table below.

TABLE 1

| Sample | Fiber Type | Fiber Length (in) | Fiber Amount (% bwoc) | 48-Hour Compressive Strength (psi) | Tensile Strength (psi) |
|---|---|---|---|---|---|
| 1 | Polyolefin | ½ | 0.53 | 6484 | 753 |
| 2 | Polyolefin | ⅛ | 0.53 | 8279 | 839 |
| 3 | Glass | ¼ | 0.53 | 7817 | 755 |
| 4 | None | — | — | 7337 | 732 |

Based on the results of these tests, the inclusion of rod-shaped fibers in the cement composition showed improved mechanical properties. For example, Sample 2 comprising the rod-shaped polyolefin fibers had a compressive strength of 8279 psi as compared to Sample 1 (fibrillated net-shaped fibers) with a compressive strength of 6484 psi and Sample 4 with a compressive strength of 7337 psi.

Example 2

Additional tests were conducted to determine the ability of different fibers to plug a simulated fracture for control of lost circulation. For this series of tests, two different cement compositions designated Samples 5 and 6 were prepared that comprised Portland Class H cement, fibers, and sufficient water to provide a density of about 16.4 lb/gal. Sample 5 comprised glass fibers having a length of ¼ inches. The glass fibers are available from Halliburton Energy Services, Inc. as WellLife® Additive. Sample 6 comprised non-fibrillated, rod-shaped polyolefin fibers having a length of ⅛ inches, a diameter of 0.00042 inches, and a denier of 7 to 10. The rod-shaped polyolefin fibers were treated with a glycerol oleate surfactant to make them hydrophilic. The polyolefin fibers are available from Forta Corporation, Grove City, Pa. After preparation, lost circulation tests were performed for each sample cement composition using the test apparatus and procedure described below.

Figure 3:
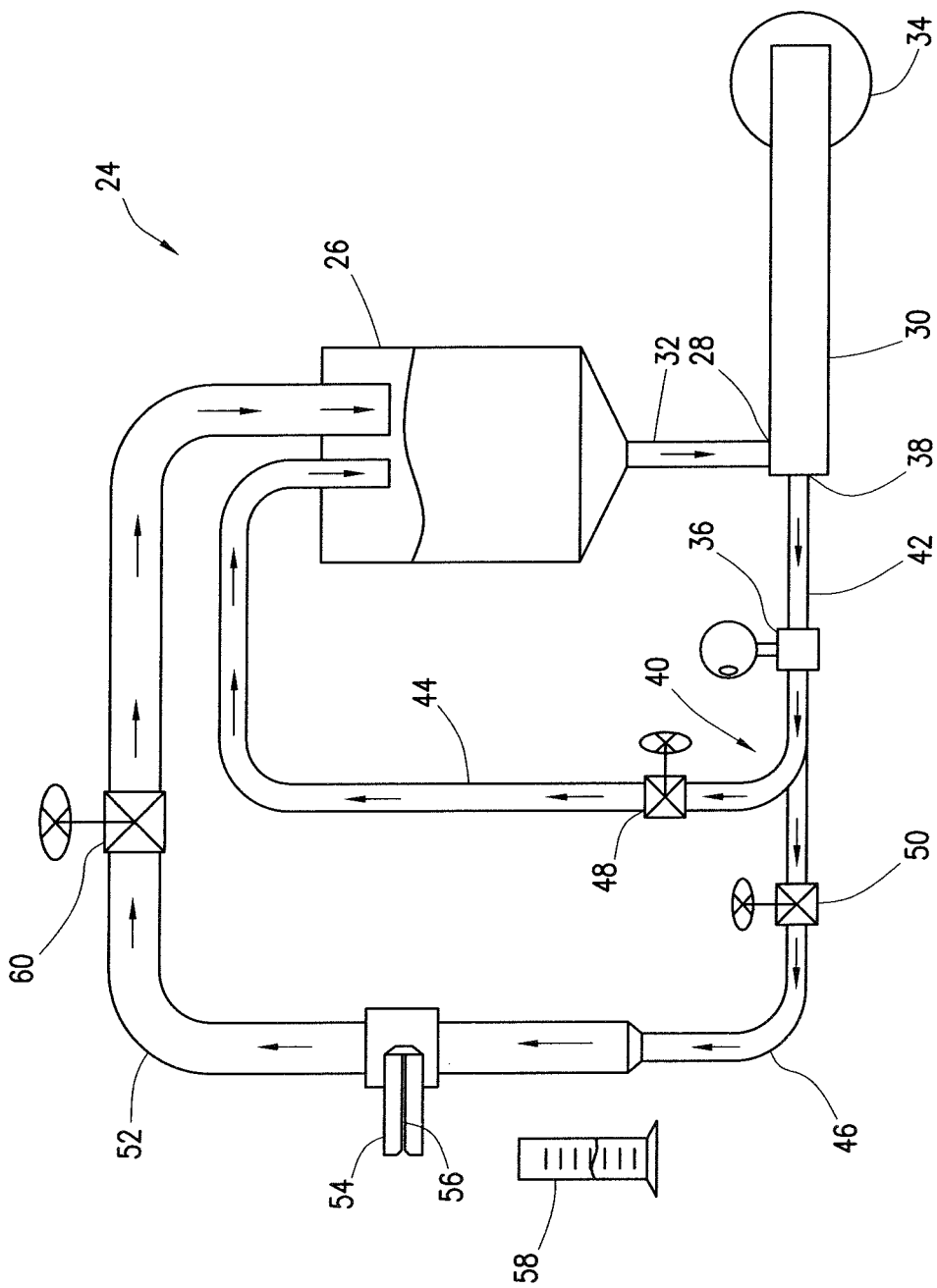
FIG. 3 illustrates an example test apparatus in accordance with embodiments of the present invention.

FIG. 3 is an illustration of an example test apparatus in accordance with an exemplary embodiment of the present invention. The test apparatus is generally referred to by the reference number 24. As illustrated, the test apparatus 24 includes a 5-gallon cement reservoir 26 connected to an inlet 28 of a progressive-cavity pump 30 (a Mono Pump) via a pump-suction conduit 32. In this example, the pump-suction conduit 32 was a 0.75-inch flow line. The progressive-cavity pump 30 had a programmable flow rate and pressure. A motor 34 used to power the progressive-cavity pump 30. In this example, the motor 34 was a Roberson Meyer Model FS15D, 1.5-horsepower motor. A pressure transducer 36 was located at an outlet 38 of the progressive-cavity pump 30.

The outlet 38 of the progressive-cavity pump 30 was connected to a two-way split 40 via a pump-outlet conduit 42. In this example, the pump-outlet conduit 42 was a 0.75-inch flow line. The two-way split 40 divided the pump-outlet conduit 42 into a bypass conduit 44 and a primary-flow conduit 46. A bypass valve 48 was located in the bypass conduit 44 after the two-way split 40. In this example, the bypass conduit 44 was a 0.75-inch flow line that returned the sample cement composition to the cement reservoir 26. A flow valve 50 was located in the primary-flow conduit 46 after the two-way split 40. Accordingly, by appropriate manipulation of the bypass valve 48 and the flow valve 50, the progressive-cavity pump 30 could be used to direct flow to either the bypass conduit 44 or the primary-flow conduit 46.

In this example, the primary-flow conduit 46 enlarged from a 0.75-inch flow line to a 2-inch flow line after the flow valve 50. In the enlarged section 52 of the primary-flow conduit 46, a hollow core 54 was inserted, the hollow core 54 having a length of 4 inches and a diameter of 1.625 inches. To simulate a fracture, the hollow core 54 included a slot 56 having a height of 2 millimeters and a width of 3 centimeters. The slot 56 was parallel to the longitudinal axis of the hollow core 54. A cylinder 58 was placed below the slot 56 to collect any fluid flowing through the slot 56. After the hollow core 54, the enlarged section 52 of the primary-flow conduit 46 returned the sample cement composition to the cement reservoir 26.

The following test procedure was performed for each sample cement composition. First, 2 gallons of the sample cement composition were prepared and poured into the cement reservoir 26. With the flow valve 50 closed and the bypass valve 48 open, the progressive-cavity pump 30 was started and a rate of 4 gallons per minute was established. After the constant flow rate was established, the flow valve 50 was opened and the bypass valve 48 was closed. This allowed the sample cement composition to flow through the primary-flow conduit 46 and past the slot 56 in the hollow core 54. As expected, there was initially a loss of the sample cement composition through the slot 56 in the hollow core 54. The slot 56 was observed to determine whether the fibers present in the sample cement composition plugged the slot 56, indicated by stoppage of loss through the slot 56. The time for each fiber to plug the slot 56 is listed below in Table 2.

After the slot 56 was plugged, the back pressure applied to the fibers plugging the slot 56 was increased to determine the ability of the fibers to withstand pressure. To increase the back pressure, valve 60 in the enlarged section 52 was manipulated to regulate the back pressure by restricting flow. The back pressure was steadily increased while observing the slot 56 until the fibers failed, indicated by resumed loss of the sample cement composition through the slot 56. The maximum back pressure withstood by each of the fibers plugging the slot 56 is listed below in Table 2.

TABLE 2

| Sample | Fiber Type | Fiber Length (in) | Fiber Amount (% bwoc) | Slot Size (mm) | Time to Plug Slot (min:sec) | Max. Back Pressure (psi) |
|---|---|---|---|---|---|---|
| 1 | Glass | ¼ | 0.53 | 2 | 0:30 | 30 |
| 2 | Polyolefin | ⅛ | 0.37 | 2 | 0:55 | 28 |

Accordingly, this example demonstrates that rod-shaped treated polyolefin fibers provide desirable levels of fluid loss control.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of preventing lost circulation in a well bore comprising:
   preparing a dry blend comprising: fibers consisting of treated polyolefin fibers; and
   a hydraulic cement; wherein the treated polyolefin fibers are non-fibrillated, rod-shaped and have a length in a range from about 0.0625 inches to about 0.1825 inches, wherein the treated polyolefin fibers have a mean diameter of from about 0.00034 inches to about 0.00090 inches and a denier in a range of from about 7 to about 10, wherein the treated polyolefin fibers comprise polyolefin fibers that have been treated with a surfactant to make the treated polyolefin fibers hydrophilic;
   preparing a cement composition comprising the dry blend and water, wherein the cement composition is non-foamed, wherein the treated polyolefin fibers are included in the non-foamed cement composition to prevent lost circulation, wherein the water is present in an amount of about 100% to about 200% by weight of the hydraulic cement;
   placing the cement composition in a well bore, wherein the treated polyolefin fibers reduce loss of fluid circulation of the non-foamed cement composition and/or any subsequently introduced fluids; and
   allowing the cement composition to set in the well bore.

2. The method of claim 1 wherein the cement composition has a density in a range of from about 4 pounds per gallon to about 20 pounds per gallon, and wherein the water is present in an amount sufficient to form a pumpable slurry.

3. The method of claim 1 wherein the hydraulic cement comprises at least one hydraulic cement selected from the group consisting of Portland cement, pozzolana cement, gypsum cement, high-alumina-content cement, slag cement, silica cement, and any combination thereof.

4. The method of claim 1 wherein the treated polyolefin fibers comprise polyethylene fibers.

5. The method of claim 1 wherein the surfactant comprises a fatty acid ester surfactant.

6. The method of claim 5 wherein the fatty acid ester surfactant comprises a fatty acid component having from 10 carbon atoms to 24 carbon atoms and a mono- or polyhedric alcohol component having from 1 carbon atom to 12 carbon atoms.

7. The method of claim 1 wherein the surfactant comprises at least one fatty acid ester surfactant selected from the group consisting of a glycerol oleate, a glycerol stearate, and a combination thereof.

8. The method of claim 1 wherein the treated polyolefin fibers are present in an amount in a range of from about 0.1% to about 5% by weight of the hydraulic cement.

9. The method of claim 1, wherein the cement composition further comprises an additive selected from the group consisting of a dispersant, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a foaming additive, a defoaming additive, a thixotropic additive, and any combination thereof.

10. The method of claim 1 wherein the placing the cement composition in the well bore comprises placing the cement composition in an annulus of the well bore.

11. The method of claim 1 wherein the allowing the cement composition to set in the well bore comprises allowing the cement composition set in an annulus of the well bore to support a pipe string disposed in the wellbore.

12. A method of controlling lost circulation in a subterranean formation comprising:
   providing treated polyolefin fibers that are non-fibrillated and have a length in a range from about 0.0625 inches to about 0.1825 inches, wherein the treated polyolefin fibers comprise polyolefin fibers that have been treated with a surfactant to make the treated polyolefin fibers hydrophilic, wherein the treated polyolefin fibers have a mean diameter of from about 0.00034 inches to about 0.00090 inches, and a denier in a range of from about 7 to about 10; and
   introducing a non-foamed cement composition comprising the treated polyolefin fibers into a well bore penetrating the subterranean formation such that the treated polyolefin fibers reduce loss of fluid circulation of the cement composition and/or subsequently introduced fluids into the subterranean formation, wherein the non-foamed cement composition further comprises a hydraulic cement and water.

13. The method of claim 12 wherein the treated polyolefin fibers comprise non-fibrillated polyethylene fibers.

14. The method of claim 12 wherein the surfactant comprises a fatty acid ester surfactant.

15. A cementing system comprising:
   a non-foamed cement composition, wherein the cement composition comprises:
      a hydraulic cement;
      water; and
      treated polyolefin fibers that are rod-shaped, non-fibrillated, and have a length in a range from about 0.0625 inches to about 0.1825 inches, wherein the treated polyolefin fibers comprise polyolefin fibers that have been treated with a surfactant to make the treated polyolefin fibers hydrophilic, wherein the treated polyolefin fibers have a mean diameter of from about 0.00034 inches to about 0.00090 inches, and a denier in a range of from about 7 to about 10.

16. The cementing system of claim 15 further comprising:
   mixing equipment for mixing the cement composition; and
   pumping equipment for delivering the cement composition into a well bore.

17. The cementing system of claim 15 wherein the surfactant comprises a fatty acid ester surfactant.

18. The cementing system of claim 15 wherein the cement composition has a density in a range of from about 4 pounds per gallon to about 20 pounds per gallon, and wherein the water is present in an amount sufficient to form a pumpable slurry.

19. The cementing system of claim 15 wherein the hydraulic cement comprises at least one hydraulic cement selected from the group consisting of Portland cement, pozzolana cement, gypsum cement, high-alumina-content cement, slag cement, silica cement, and any combination thereof.

20. The cementing system of claim 15 wherein the treated polyolefin fibers comprise polyethylene fibers.

21. The cementing system of claim 15 wherein the surfactant comprises a fatty acid ester surfactant, wherein the fatty acid ester surfactant comprises a fatty acid component having from 10 carbon atoms to 24 carbon atoms and a mono- or polyhedric alcohol component having from 1 carbon atom to 12 carbon atoms.

22. The cementing system of claim 15 wherein the surfactant comprises at least one fatty acid ester surfactant selected from the group consisting of a glycerol oleate, a glycerol stearate, and a combination thereof.

23. The cementing system of claim 15 wherein the treated polyolefin fibers are present in an amount in a range of from about 0.1% to about 5% by weight of the hydraulic cement.

24. The cementing system of claim 15, wherein the cement composition further comprises an additive selected from the group consisting of a dispersant, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a foaming additive, a defoaming additive, a thixotropic additive, and any combination thereof.

* * * * *